United States Patent [19]

Hamilton et al.

[11] Patent Number: 5,580,422
[45] Date of Patent: Dec. 3, 1996

[54] BRIGHTENING COLOR DYED WASTEPAPER WITH A BLEACHING AGENT AND A QUATERNARY COMPOUND

[75] Inventors: Glynn A. Hamilton, Charlotte; Paul W. Shepperd, III, Mooresville, both of N.C.

[73] Assignee: Hoechst Celanese Corporation, Somerville, N.J.

[21] Appl. No.: 97,695

[22] Filed: Jul. 27, 1993

[51] Int. Cl.⁶ .................................................. D21B 1/08
[52] U.S. Cl. ................................... 162/4; 162/7; 162/8
[58] Field of Search ..................... 162/5, 7, 8, 162, 162/80, DIG. 3

[56] References Cited

U.S. PATENT DOCUMENTS

| | | | |
|---|---|---|---|
| 1,572,478 | 2/1926 | Hammond . | |
| 1,923,178 | 8/1933 | Ulrich et al. | 260/127 |
| 2,003,928 | 6/1935 | Evans et al. | 8/2 |
| 2,019,124 | 10/1935 | Evans et al. | 8/2 |
| 2,164,930 | 7/1939 | Lubs | 8/34 |
| 2,218,479 | 10/1940 | Peterson et al. | 92/9 |
| 2,248,128 | 7/1941 | Seymour et al. | 8/64 |
| 2,525,770 | 10/1950 | Cook et al. | 8/102 |
| 2,587,597 | 3/1952 | Cook et al. | 8/102 |
| 2,860,944 | 11/1958 | Young | 8/104 |
| 2,902,453 | 9/1959 | Matlin | 252/105 |
| 2,985,500 | 5/1961 | Janson et al. | 8/102 |
| 2,986,488 | 5/1961 | Weisgerber et al. | 162/158 |
| 3,074,774 | 1/1963 | Sapers et al. | 8/69 |
| 3,361,794 | 1/1968 | Wakeman et al. | 260/501.15 |
| 3,554,863 | 1/1971 | Hervey et al. | 162/158 |
| 3,591,325 | 7/1971 | Sapers | 8/102 |
| 3,617,439 | 11/1971 | Chapman | 162/158 |
| 3,666,409 | 5/1972 | Yoshikawa et al. | 23/116 |
| 3,960,649 | 6/1976 | Sullivan | 162/72 |
| 4,013,505 | 3/1977 | Balcar et al. | 162/5 |
| 4,144,122 | 3/1979 | Emanuelsson et al. | 162/158 |
| 4,264,412 | 4/1981 | Hasler et al. | 162/4 |
| 4,441,962 | 4/1984 | Osborn | 162/111 |
| 4,557,801 | 12/1985 | Avis | 162/157.6 |
| 4,618,400 | 10/1986 | Wood et al. | 162/5 |
| 4,632,730 | 12/1986 | Ulubay et al. | 162/111 |
| 4,666,558 | 5/1987 | Wood et al. | 162/5 |
| 4,710,267 | 12/1987 | Elsby et al. | 162/5 |
| 5,013,404 | 5/1991 | Christiansen et al. | 162/72 |
| 5,129,987 | 7/1992 | Joachimides et al. | 162/25 |

FOREIGN PATENT DOCUMENTS 8225489  9/1976  Japan .

OTHER PUBLICATIONS

Berger et al. "Advanced Bleaching Technology for Secondary Fibers", Pacific Paper Expo, MB, Canada, Fall 1990.
*Dyeing and Chemical Technology of Textile Fibers*, by E. R. Troutman (fifth edition, Charles Griffin and Co. Ltd., Great Britain, 1975).
*Organic Reactions*, vol. 14 (John Wiley & Sons, Inc., New York, 1987) at pp. 388–393.
C. R. Noller, *Textbook of Organic Chemistry* (W. B. Saunders Co., Philadelphia, Pennsylvania, 1966) at p. 244.
*Advanced Organic Chemistry*, J. March (third edition, John Wiley & Sons, New York, 1985) at pp. 364–368, 845.
TAPPI, Standard Method T218 om–91, "Forming handsheets for reflectance testing of pulp (Büchner funnel procedure)" 1991.
TAPPI, Standard Method T494 om–88, "Tensile breaking properties of paper and paperboard (using constant rate of elongation apparatus)" 1988.
TAPPI, Standard Method T525 om–86, "Diffuse brightness of pulp (d/0°)", 1986.
TAPPI, Standard Method T205 om–88, "Forming handsheets for physical tests of pulp", 1988.

*Primary Examiner*—Donald E. Czaja
*Assistant Examiner*—Dean T. Nguyen
*Attorney, Agent, or Firm*—Rosemary M. Miano

[57] ABSTRACT

A method for brightening fiber from colored waste paper comprising bleaching pulp from colored waste paper with sodium hydrosulfite, formamidine sulfinic acid, or hydrogen peroxide in the presence of a selected quaternary compound.

29 Claims, No Drawings

BRIGHTENING COLOR DYED WASTEPAPER WITH A BLEACHING AGENT AND A QUATERNARY COMPOUND

BACKGROUND OF THE INVENTION

This invention concerns enhancing the color removal from colored waste paper, for example, post-consumer colored paper being recycled or colored broke being recycled from a papermaking machine. The method of the invention describes a process for brightening fiber from colored waste paper while increasing fiber web or paper web strength.

In current methods of processing colored waste paper for use in recycled paper products the waste paper is usually bleached prior to forming the new product so that the desired color and brightness can be obtained in the new product. There are a number of problems associated with the recycling of such colored waste paper. These include (1) the presence of residual color from dyes used to dye the paper and dyes used in certain types of printing, and (2) loss of strength of the fiber during processing. Typically, attempts to produce high brightness have included the use of multiple-stage bleaching employing hydrogen peroxide or chlorine-containing oxidative bleaches which adversely affect the pulp strength. In addition, the chlorine containing bleaches may contribute to the formation of chlorinated organics which are environmentally undesirable. Methods to recover the loss of strength have included adding expensive kraft fiber or bonding agents to the pulped material.

There have been a number of attempts at forming improved pulps.

U.S. Pat. No. 4,710,267 to Elsby et al discloses dye removal from recycled fiber using tertiary or quaternary ammonium compounds. These ammonium compounds have a carbonyloxy portion. Customary bleaching agents may be used in conjunction with these ammonium compounds.

Japanese Patent Application Number 82/25489 teaches color removal by washing the pulp with alkylamine-propoxylates-ethoxylates.

U.S. Pat. No. 2,003,928 to Evans et al describes enhanced bleaching of textiles containing azoic dyes with the use of sodium dithionite and a quaternary ammonium salt having not less than 10 carbons.

U.S. Pat. No. 5,013,404 to Christiansen et al describes the alkaline hydrogen peroxide bleaching of mechanical wood pulp with a quaternary amine compound with an hydroxy group such as (3-chloro-2-hydroxypropyl trimethyl)ammonium chloride.

U.S. Pat. No. 3,554,863 to Hervey et al teaches the use of cationic quaternary amine compounds as debonding agents for pulp sheets. The use of such compounds lowers the tensile strength of the sheets.

U.S. Pat. No. 3,617,439 to Chapman describes a method for improving comminution of pulp sheets from cellulosic fibers in order to make fibers from which air-laid absorbent products may be prepared. The method includes the use of a quaternary zwitterionic surfactant.

U.S. Pat. No. 4,144,122 to Emanuelsson et al describes the use of quaternary ammonium compounds to treat cellulose pulp and paper to reduce inter-fiber bonding and thereby obtain a low mechanical strength for the fibers.

U. S. Pat. No. 4,441,962 to Osborn discloses a process for making absorbent tissue paper webs using quaternary ammonium compounds as debonding agents to weaken the strength of the interfiber bonds.

U.S. Pat. No. 4,632,730 to Ulubay et al discloses a method for increasing the absorption rate of paper using selected ethoxylated and/or propoxylated compounds.

Enhanced bleaching of textiles containing dyes is described in *Dyeing and Chemical Technology of Textile Fibers*, by E. R. Troutman (fifth edition, Charles Griffin and Co., Ltd., 1975).

U.S. Pat. No. 5,129,987 to Joachimides et al discloses a method for bleaching mechanical wood pulp with sodium hydrosulfite in a refiner.

There still remains a need for a method of decolorizing colored waste paper which will result in a well bleached pulp with significant increase in fiber strength. Thus, it is an object of the present invention to provide such a method. It is a further object of the present invention to provide a method for recycling colored waste paper which results in a pulp which can be used to form acceptable recycled products. It is yet another object of the invention to provide a process for recycling colored waste paper which is acceptable environmentally. These and other objects of the invention will become apparent from the description of the invention.

SUMMARY OF THE INVENTION

The present invention provides a method for the enhanced bleaching of pulp containing pulp from colored waste paper. The method comprises brightening fiber from colored waste paper while increasing paper web strength. The method comprises bleaching pulp made from colored waste paper with a bleaching chemical selected from the group consisting of a hydrosulfite (for example, sodium hydrosulfite or zinc hydrosulfite), formamidine sulfinic acid (FAS), or hydrogen peroxide in the presence of at least one quaternary compound selected from the group consisting of (a) compounds of Formula I:

Formula I wherein:
one of $R^1$, $R^2$, $R^3$ and $R^4$ is selected from the group consisting of $C_{14}$-$C_{22}$ alkyl and $C_{14}$-$C_{22}$ alkenyl, wherein the alkyl or alkenyl optionally contains one to three substituents selected from methyl and ethyl (especially methyl);
the remaining R groups are each independently selected from the group consisting of $C_1$-$C_4$ straight chain alkyl, —$(C_2H_4O)_xH$ and —$(C_3H_6O)_xH$ where x=a number from 1 to 4 inclusive;
Z is selected from the group consisting of nitrogen and phosphorous, preferably nitrogen; and
X is selected from the group consisting of any suitable and convenient anion (for example, X is selected from the group consisting of $CO_3^{-2}$, $HCO_3^{-1}$, $PO_4^{-3}$, $HPO_4^{-2}$, $H_2PO_4^{-1}$, $OH^{-1}$, $F^{-1}$, $Br^{-1}$, $Cl^{-1}$, $I^{-1}$, $HSO_3^{-1}$, $HSO_4^{-1}$, $SO_4^{-1}$, $SO_3^{-2}$, $S_2O_4^{-2}$, $CH_3CO_3^{-1}$ and $CH_3SO_4^{-1}$);

(b) compounds of Formula II wherein:

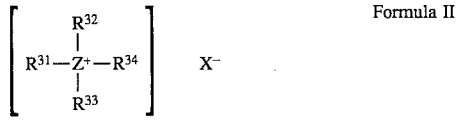

Formula II wherein:

two of $R^{31}$, $R^{32}$, $R^{33}$ and $R^{34}$ are selected independently from the group consisting of $C_8$–$C_{22}$ straight chain alkyl and $C_8$–$C_{22}$ alkenyl, wherein the alkyl or alkenyl optionally contains one to three substituents selected from methyl and ethyl (especially methyl);

the remaining R groups are each independently selected from the group consisting of $C_1$–$C_4$ straight chain alkyl and —$(C_2H_4O)_xH$ and —$(C_3H_6O)_xH$ where x=a number from 1 to 4 inclusive; and Z has the same meaning as defined under Formula I.

(c) compounds of Formula III:

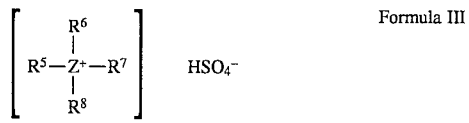

Formula III wherein:

$R^5$, $R^6$, $R^7$ and $R^8$ are each independently selected from the group consisting of $C_1$–$C_4$; and Z has the same meaning as defined for Formula I;

(d) a pyridinium salt of Formula IV:

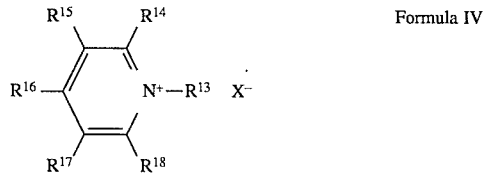

Formula IV wherein:

$R^{13}$ is selected from the group consisting of $C_{14}$–$C_{22}$ alkyl and $C_{14}$–$C_{22}$ alkenyl, wherein the alkyl or alkenyl optionally contains one to three substituents selected from methyl and ethyl (especially methyl);

the remaining R groups are each independently selected from the group consisting of hydrogen, $C_1$–$C_3$ straight chain alkyl; and $X^-$ has the same meaning as described in Formula I;

(e) compounds of Formula V:

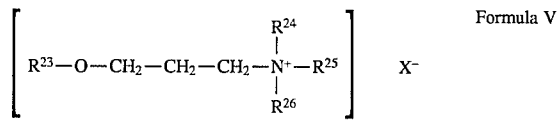

Formula V wherein:

$R^{23}$ is selected from the group consisting of $C_8$–$C_{14}$ alkyl and $C_8$–$C_{14}$ alkenyl, where the alkyl and alkenyl optionally (but not preferably) have one to three substituents selected from methyl and ethyl (especially methyl); and each of $R^{24}$, $R^{25}$, and $R^{26}$ are independently selected from the group consisting of $C_1$–$C_4$ alkyl, $C_2$–$C_4$ alkenyl, $(CH_2—CH_2—O)_nH$ and $(CH_2—CH_2—CH_2—O)_nH$ where n=a number from 1 to 4 inclusive.

For any of the R groups listed in Formulae I through V, any carbon atom (a) attached to the nitrogen or phosphorous, (b) adjacent to the nitrogen or phosphorous or (c) next adjacent to the nitrogen, may also be substituted by one or more electron withdrawing groups such as chlorine, fluorine, $CH_2F$ and $CF_3$, provided that chlorine and fluorine are not attached to the nitrogen or phosphorous. Such compounds would include those having only one electron-withdrawing group as well as those with multiple substitutions with such groups. Examples of those having multiple electron-withdrawing groups include the following wherein each of the Y designations indicates sites where electron withdrawing groups such as the ones described above may be used:

(a) compounds of Formula IA:

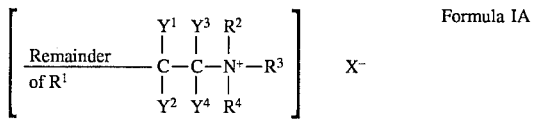

Formula IA wherein $R^1$, $R^2$, $R^3$ and $R^4$ have the meanings described for Formula I, and each of the Y substituents are independently selected from the group consisting of chlorine, fluorine, $CH_2F$ and $CF_3$;

(b) compounds of Formula I in which at least one of $R^2$, $R^3$ and $R^4$ is independently selected from the group consisting of $CH_2F$ and $CF_3$;

(c) compounds of Formula II in which at least one of $R^{32}$, $R^{33}$ and $R^{34}$ is independently selected from the group consisting of $CH_2F$ and $CF_3$; and (d) compounds of Formula IV in which at least one of $R^{14}$–$R^{18}$ is selected from the group consisting of chlorine, fluorine, $CH_2F$ and $CF_3$.

The method of the present invention comprises using one or more quaternary compounds as described above with hydrosulfite (such as sodium or zinc hydrosulfite), formamidine sulfinic acid or hydrogen peroxide bleaching. This may be done by (1) premixing a solution of bleach and quaternary compound and then adding that solution to the pulp slurry; (2) adding the quaternary compound to a pulp slurry at the same time as the bleaching compound is added for bleaching; or (3) adding the quaternary compound to the pulp slurry shortly before the bleach or bleach solution is added.

The bleach solution may be stabilized with chelate (such as may be selected from ethylenediaminetetraacetic acid, sodium tripolyphosphate, and diethylenetriaminepentaacetic acid) or alkali (such as sodium hydroxide, sodium carbonate and calcium hydroxide) as needed. The bleaching in conjunction with the additives described above results in pulp products which do not show significant deterioration in strength.

DETAILED DESCRIPTION OF THE INVENTION AND DESCRIPTION OF THE PREFERRED EMBODIMENTS

The method of the present invention comprises using one or more of the quaternary compounds described above with hydrosulfite, formamidine sulfinic acid or hydrogen peroxide for bleaching colored waste paper while increasing the strength characteristics of the fiber web.

The method of this invention is particularly useful with hydrosulfite (especially sodium hydrosulfite) or FAS.

While the general definitions for the R groups and the value of X have been listed above for Formula I, it is preferred that the long chain alkyl group described for $R^1$ be selected from the group $C_{14}$–$C_{18}$ and be a straight chain; the most preferred value for this $R^1$ group is straight chain $C_{16}$. It is also preferred that the other three R groups be methyl or $C_2H_4OH$, especially methyl. The preferred value for X is $HSO_4^-$.

While the general definitions for the R groups in Formula II have been listed, it is preferred that two of $R_{31}$–$R^{34}$ be selected independently from the group consisting of $C_{10}$–$C_{18}$ straight chain alkyl, more preferably $C_{10}$–$C_{14}$ and most preferably $C_{12}$, and that the other two of $R^{31}$–$R^{34}$ be independently selected to be methyl or $C_2H_4OH$.

While the general definitions for the R groups in Formula III have been described, it is preferred that $R^5$ be selected from the group consisting of $C_{14}$–$C_{18}$ alkyl and, more preferably, selected to be $C_{16}$ straight chain alkyl. It is also preferred that $R^6$, $R^7$ and $R^8$ each be independently selected from the group consisting of $C_1$–$C_4$ straight chain alkyl and, more preferably, selected to be methyl.

While the general definitions for the R groups in Formula IV have been described, it is preferred that $R^{13}$ be selected from the group consisting of $C_{14}$–$C_{18}$ alkyl and, more preferably, selected to be $C_{16}$ straight chain alkyl. It is also preferred that $R^{14}$ and $R^{15}$ each be independently selected from the group consisting of $C_1$–$C_3$ straight chain alkyl to be hydrogen.

While the general definitions for the R groups in Formula V have been described, it is preferred that $R^{23}$ be selected from the group consisting of $C_8$–$C_{14}$ straight chain alkyl and, more preferably, selected from the group consisting of $C_{11}$ to $C_{13}$ alkyl. It is also preferred that $R^{24}$, $R^{25}$ and $R^{26}$ each be independently selected from the group consisting of $C_1$–$C_4$ straight chain alkyl and, more preferably, selected to be methyl.

A particularly preferred group of compounds are compounds of Formula I where $R^1$ is a straight chain alkyl, each of $R^2$, $R^3$ and $R^4$ is methyl, and $X^-$ is selected from the group consisting of $HSO_4^-$, Br and Cl$^-$. Such compounds include cetyltrimethylammonium hydrogen sulfate (most preferred), cetyltrimethylammonium bromide and cetyltrimethylammonium chloride.

Other specific groups of compounds are compounds of Formula I where:

$R^1$ is selected from the group tallow and coco fatty alkyl;

one of $R^2$, $R^3$, and $R^4$ is methyl, the other two of $R^2$, $R^3$ and $R^4$ are each $(CH_2CH_2O)H$; and $X^-$ is Cl$^-$. Specific examples of such compounds are methyl-bis-(2-hydroxyethyl)tallow-ammonium chloride (preferred) and methyl-bis-(2-hydroxy-ethyl)cocoammonium chloride.

A particular group of values for X is the group consisting of $HSO_4^-$, $CH_3CO_3^-$ and $CH_3SO_4^-$, Br, Cl, I and OH. Preferred values for $X^-$ are $HSO_4^-$, $CH_3CO_3^-$ and $CH_3SO_4^-$.

Yet other particular groups of compounds are where (a) one of $R^1$, $R^2$, $R^3$ and $R^4$ has a methyl substituent;

(b) one of $R^{31}$, $R^{32}$, $R^{33}$ and $R^{34}$ has a methyl substituent;

(c) $R^{13}$ has a methyl substituent; and (d) $R^{23}$ has a methyl substituent.

A particular bleaching compound is sodium hydrosulfite.

The compounds of Formulae I, II and III where Z=nitrogen may be made by methods well known to those skilled in the art such as by alkylation of a tertiary amine, or sometimes purchased commercially. For compounds of Formula I where Z=phosphorous, some of these compounds may be purchased commercially. Others may be made by methods known to those skilled in the art. For example, the methods described in *Organic Reactions*, Volume 14 (John Wiley & Sons, Inc. 1987) at pages 388–393 (incorporated by reference herein) describe such methods, except that the appropriate trialkylphosphine would be used instead of the triphenyl material described.

The compounds of Formula IV may be made in the same manner as compounds of Formulae I and II except that the starting material is pyridine or a substituted pyridine.

The compounds of Formula V may be made by reacting a primary alcohol of formula $R^{23}$—OH with a quaternary amine propyl epoxide of Formula VI:

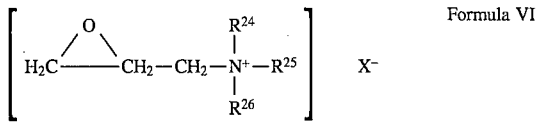

under alkaline conditions. The reaction scheme is as follows:

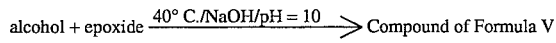

It is also to be noted that in selecting quaternary compounds to be used in this invention, mixtures of quaternary compounds may be used. These mixtures may be made by blending different quaternary compounds together or may be found in the products itself. Synthetic or natural materials may be used. For example, for the longer chain alkyl groups, a mixture of chain lengths such as may be found in the chain distribution naturally occurring in materials such as tallow, lard, soybean, coconut, tall oils and products from petroleum cracking towers may be used Additionally, synthetic fatty materials may also be used when compounds having a specific chain length are desired.

In general, fats may be saponified, the reaction products skimmed off and acidified. The fatty acid thus formed may be subjected to an amination reaction such as the Schmidt reaction to form the quaternary compound. (A description of the Schmidt reaction may be found in C. R. Noller, *Textbook of Organic Chemistry* (W. B. Saunders Co., 1966) at page 224, incorporated by reference herein.

In the processing of colored waste paper the paper is repulped by adding it to water to form a slurry of 3 to 40 percent dry fiber (also called 3 to 40 percent consistency) in a pulper (a device which subjects the paper to severe agitation thereby separating the paper into individual fibers). The fiber slurry may be subjected to a deinking process (for example, by using washing or flotation processes well known to those in the art) prior to treatment with the quaternary compound and the hydrosulfite. The resulting pulp may be pretreated with a chelate such as ethylenediaminetetraacetic acid, diethylenetriaminepentaacetic acid, sodium tripolyphosphate, to name a few, if desired.

It should be noted that both broke and waste paper may be repulped with or without the use of caustic, depending on the physical and optical properties required. These methods are known to those skilled in the art.

At one or more points in the processing of colored waste paper a bleaching step is used. Conventionally, such bleaching is done with the use of FAS, peroxide and/or hydrosulfite. For FAS or hydrosulfite, the amount of bleaching agent added is from 0.05–3 weight percent based on the oven dried weight of the pulp. For peroxide, the amount of hydrogen peroxide used is from 0.05–5 weight percent based on the oven dried weight of the pulp where the peroxide is a 50 percent by weight solution. Appropriate amounts of other concentrations of peroxide (such as a 30% solution which is also commercially available) may be used.

In conventional techniques, the bleaching agent is added to a pulp slurry at a pump or other point where satisfactory mixing can be achieved (with minimum air contact if either hydrosulfite or FAS is used). The pulp mixture is then held for at least one hour in a tower or chest where minimum air contact is allowed if either hydrosulfite or FAS is used. The bleaching reaction takes place during this time. Note that for peroxide bleaching, the minimizing of air contact is not usually a concern.

The bleaching can be repeated, but usually such bleaching is not done more than two times.

The present invention provides a method for enhancing the hydrosulfite, FAS or hydrogen peroxide bleaching of colored broke or waste paper with significant increase of the strength of the resulting fiber web.

The aqueous pulp slurry is heated to a temperature of from about 120 degrees to about 180 degrees F. (50–82 degrees C.). The pH of the slurry is adjusted so that it is in the range of 3.5 to 11. This pH adjustment may be accomplished by using NaOH or $Na_2CO_3$ as the base and $H_2SO_4$ as the acid. The addition of at least one quaternary compound of the Formulae described above is accomplished by one of the following methods:

(a) Quaternary compound is added to the bleach solution
  (1) The quaternary compound is dissolved in water at a level of from 1 to 50 percent based on the weight of the bleaching compound to be used.
  (2) The pH is adjusted to 10 with NaOH or $Na_2CO_3$.
  (3) The bleaching agent is added to the solution (and dissolved if a solid).

(b) Quaternary compound is blended with the hydrosulfite, FAS or hydrogen peroxide
  (1) At least one quaternary compound is mixed with the selected bleaching compound in a ratio of from about 1 percent to about 50 percent based on the weight of the bleaching compound used.
  (2) The blended mixture is then added to the pulp slurry which has been prepared as described above.

(c) Quaternary compound is added at the same time the hydrosulfite or FAS or $H_2O_2$ is added
  (1) At least one quaternary compound is added to the pulp slurry which has been prepared as described above.
  (2) The addition of the quaternary compound is done at about the same time the bleaching compound is added to the pulp slurry.

The addition levels of quaternary compound are in the range of 1 to 50 percent based on the weight of the bleaching compounds used. For one ton of fiber (oven dried basis), this means that about 5–40 pounds (2.3–18.2 kg) are used.

The amount of hydrosulfite added is from 0.05–3 percent (examples being 0.25–1.0%, 0.5–1.0% and 0.5–1.5%) based on the oven dry weight of pulp, with a particular value being from 0.5–1%. This means that for one ton of fiber 1.0–60 pounds (0.45–27.2 kg) may be used.

The amount of FAS added is from 0.05–2 percent based on the oven dry weight of pulp, with a particular value being from 0.25–1%. This means that for one ton of fiber 1.0–40 pounds (0.45–18.2 kg) may be used.

The amount of hydrogen peroxide (based on 50% concentration) added is from 0–5 percent based on the oven dry weight of pulp, with a particular value being 0.5–3% such as 3%. This means that for one ton of fiber 1–100 pounds (0.45–45.4 kg) may be used.

In a system containing one ton of oven dried pulp, typical addition levels for the quaternary compound may be in the range of 5 pounds (2.3 kg) (0.25 percent addition level based on weight of bleaching compound) to about 20 pounds (9.1 kg) (1.0 percent addition level) with:

(a) 5–50 pounds (2.3–22.7 kg) of hydrosulfite; or
(b) 3–15 pounds (1.4–6.8 kg) of FAS; or
(c) 30–100 pounds (13.6–45.5 kg) of hydrogen peroxide (50% solution).

After the bleaching compound and quaternary additive have been added to the pulp slurry, the pulp is mixed, preferably intensely, and preferably under a non-oxidizing atmosphere (if hydrosulfite or FAS is used) such as nitrogen, while maintaining the temperature between 80 degrees F. (25 degrees C.) and 212 degrees F. (100 degrees C.). If good mixing has been achieved, the time needed for bleaching is usually in the range of from about one-half hour to about one and one-half hours. Longer periods of time may be used if desired or if convenient.

After the bleaching step has been completed, the pulp is cooled, for example, by dilution with mill process or whitewater. The pH is then adjusted according to the requirements of the particular paper machine or the paper products being made. For example, such pH's may be in the range of from about 3.5 to about 11 and effected by using a base such as sodium hydroxide or sodium carbonate, or an acid such as sulfuric acid. The selection of pH is not a part of this invention. Those skilled in the art will also recognize that the method of this invention may also be used with pulps which are made with partial amounts of colored waste paper.

Evaluation of Effects of Bleaching on Pulp

In order to evaluate the effect of this method on pulp two evaluations may be performed.

Brightness

The first evaluation is a brightness assessment. This assessment is done by making pads using Technical Association of the Paper and Pulp Industry (TAPPI) Standard Method T218 om-91, incorporated by reference herein in its entirety. The brightness evaluation is then done in accordance with TAPPI Standard Method T525 om-86, incorporated by reference herein in its entirety. Generally, method T218 om-91 describes the formation of handsheets for measuring the reflectance of pulp and method T525 om-86 describes how to measure the diffuse brightness of pulp.

The significance of the brightness data shown in Tables I and II below is that any value at least one point above the 63.5 percent value for a sample bleached with hydrosulfite alone is a significant improvement. In the same manner any value at least one point above the 65.2 baseline value for FAS is considered significant. The "ISO Brightness" is a method of measuring brightness developed by the International Organization for Standardization and is familiar to those skilled in the art. This measurement is done by measuring the percent reflectance of light at 457 nanometers.

Strength

The second evaluation is an assessment of the strength of handsheets made with pulp bleached using the process of this invention. Handsheets were made using TAPPI Standard Method T205 om-88, incorporated by reference herein in its entirety. The control is a handsheet made by the same TAPPI method, except that the pulp used for the control handsheet is made from pulp bleached with hydrosulfite alone and no quaternary additive. Blanks are made using the same TAPPI method, except that the handsheets are made from pulp which has not been treated with either or both of hydrosulfite or quaternary additive. The strength of the handsheets is evaluated using TAPPI Standard Method T494 om-88, incorporated by reference herein in its entirety. This T494 method is used to evaluate the tensile breaking properties of paper and paperboard using apparatus for measuring the constant rate of elongation.

The significance of strength in Table I was determined by null-hypothesis testing at the 95% confidence level using the SigmaStat software package (Jandell Scientific Company) which showed that Examples 5 and 6 (Table I) were significantly higher in tensile strength than Examples 3 and 3A and especially higher than Example 1 (untreated pulp).

EXAMPLES

The following Examples are illustrative of the invention but should not be interpreted as limitations thereon. Unless otherwise indicated, all percents are in weight percents and all symbols have their usual and customary meanings: ° C. is degrees Centigrade, ml is milliliter, kg is kilogram, g is gram, lb is pound, DTPA is diethylenetriaminepentaacetic acid pentasodium salt, and CTAB is cetyltrimethylammonium bromide. NA means not available. Chemical symbols have their usual and customary meanings.

The colored paper referenced in these examples was obtained from a local office products supply store in Charlotte, N.C. and was a random selection.

The strength data was obtained by first forming handsheets from the bleached pulp according to the TAPPI Standard Method T205 om-88 and measuring the strength of sheets formed according to the procedure described in TAPPI Standard Method T494 om-88.

All pulps made in the following Examples were stored at 34 degrees F. (1 degree C.) until used.

Note in some cases the data is the average of multiple tests.

Example 1

Unbleached Pulp

A stock of colored ledger waste paper pulp was made by the following method. To 5 lb. (2.27 kg) of colored broke was added 20.7 liters of water at 65° F. (25° C.) in a Laboratory Pulper (Adirondack Machine Company, Glynns Falls, N.Y.). Repulping was carried out over a period of 15 minutes. The resulting pulp slurry (containing 10 percent solids) was used as the supply of pulp for the following Examples.

For the Examples in which bleaching was done with hydrogen peroxide, the pulp sample was dewatered to a consistency of 12 percent (12 percent solids) on a Büchner funnel fitted with a #4 Whatman filter paper.

For the Examples in which bleaching was done with sodium hydrosulfite, a sample of pulp was diluted to 4 percent consistency (4 percent solids) with deionized water.

Example 2

Peroxide Bleaching

Five plastic bags were each filled with 100 grams of pulp prepared according to Example 1 and having 12 percent consistency. The bags were closed and placed in a water bath which was brought up to a temperature of 140 degrees F. (60 degrees C.). The bags of pulp were then emptied into the bowl (1 gallon or 3.8 liter capacity) of a Hobart Planetary Action Mixer. While mixing the pulp, a bleach solution was added slowly by syringe. This bleach solution was made by mixing:

(a) 20 ml of a 10 percent (weight/weight) aqueous $H_2O_2$ solution (equivalent to 2 percent $H_2O_2$ on a dry pulp basis);

(b) 20 ml of a 7.5 percent (weight/weight) aqueous NaOH solution (equivalent to 1.5 percent NaOH on a dry pulp basis); and (c) 20 ml of a 0.2 percent (weight/weight) aqueous solution of DTPA (equivalent to 0.04 percent DTPA on a dry pulp basis).

After mixing the pulp with the bleach solution, the pulp was divided into five equal parts and returned to the plastic bags. The bags were held at the 60 degree C. temperature for 90 minutes in a water bath. Each bag of pulp was removed from the bath and placed in one beaker. Then, 10 ml of sulfurous acid (6 percent $SO_2$ in deionized water) was added with mixing to the pulp to neutralize the residual peroxide. The bleached pulp was then diluted to 4 percent consistency with deionized water. A representative sample was removed and a brightness pad was formed according to the TAPPI Standard Method T218 om-91 referenced above. The brightness data is found in Table I. This data is the average measurement of data collected for two pads.

EXAMPLE 3

Sodium Hydrosulfite Bleaching

Samples of pulp (375 gram samples of 4 percent consistency) prepared and stored according to the method of Example 1 were placed in 2 500 ml wide mouth polyethylene bottles (375 g/bottle). The bottles were heated to 150 degrees F. (65.5 degrees C.) using a water bath. The bottles were then transferred to a deaeration station equipped with a vacuum gauge and a line (equipped with a Firestone valve) attached to a vacuum apparatus (water aspirator) and a nitrogen supply. The pulp was deaerated by alternatively subjecting the bottle to a vacuum created by a water aspirator and then flushing the bottle with nitrogen. This was done three times. Each bottle was then moved to a mixing station consisting of a rubber stopper permanently attached to a ring stand through which was mounted an overhead variable speed mixer, a pH probe, and a nitrogen line. The rubber stopper also contained an opening through which bleach was added via syringe. Mixing was started and the pH was adjusted to 7.0 using 0.1N NaOH or 0.1N $H_2SO_4$ as required. Sodium hydrosulfite (10 ml of a 1.5 percent solution (weight/weight, sodium hydrosulfite/deionized water)) was then added by syringe. Stirring was continued for 3 minutes, after which each bottle was recapped and returned to the water bath (150 degrees F., 65.5 degrees C.) for one hour. The pulp was then removed from the water bath and a representative sample (3 g dry weight) was removed and used to form a brightness pad according to Tappi Standard Method T218 om-91 referenced above. The brightness data is found in Table I.

EXAMPLE 3A

Example 3 was repeated.

EXAMPLE 3B

The method described in Example 3 was repeated except that 10 ml of 1.5 percent (by weight) solution of FAS in deionized water was used in place of the sodium hydrosulfite solution.

EXAMPLE 4

Peroxide/Hydrosulfite Two Stage Bleaching

Two bottles were each filled with a sample of pulp (each sample being 375 g of a 4.0 percent consistency pulp) treated according to the method of Example 2 for peroxide bleaching of pulp. Each sample was then treated using the method of Example 3. A brightness pad was made according to TAPPI Standard Method T218 om-91. The brightness data is listed in Table I.

EXAMPLE 5

Hydrosulfite and Quaternary Compound, Preblended

Two bottles were each filled with a sample of pulp (each sample being 375 g of a 4.0 percent consistency pulp) prepared according to the method of Example 1 for making the pulp. The pulp was treated according to the method of Example 3, except that the 10 of hydrosulfite bleach solution was premixed with 10 ml of 0.75 percent by weight of cetyltrimethyl ammonium bromide (CTAB) before it was added to the pulp. A brightness pad was made according to TAPPI Standard Method T218 om-91. The brightness data is listed in Table I.

EXAMPLE 6

Hydrosulfite and Quaternary Compound, Quat Added First

The method described in Example 5 was repeated except that 10 ml of a 0.75 by weight of CTAB was added just prior to the addition of the 10 ml of 0.75 percent (weight/weight) hydrosulfite solution.

EXAMPLE 6A

The method described in Example 6 was repeated except that the hydrosulfite was replaced with 10 ml of a 1.5 percent (by weight) solution of FAS.

EXAMPLE 7

Effect of Chelate

Two bottles were each filled with a sample of pulp (each sample being 375 g of a 4.0 percent consistency pulp) prepared according to the method of Example 1 for making the pulp. The pulp was then treated according to the method described in Example 6, except that 5 ml of a 0.3 percent aqueous solution (based on weight) of diethylenetriaminepentaacetic acid pentasodium salt (DTPA salt) was added just prior to the pH adjustment described in Example 3.

EXAMPLE 8

Elevated Temperature and pH

Two bottles were each filled with a sample of pulp (each sample being 375 g of a 4.0 percent consistency pulp) prepared according to the method of Example 1 for making the pulp. The pulp was then treated using the method described in Example 3, except that the temperature of the pulp was raised to 180 degrees F. (82.2 degrees C.) and the pH of the pulp was adjusted to 8.5 prior to bleaching instead of 7.0.

EXAMPLE 8A

Hydrosulfite +CTAB, Elevated Temperature and pH

Two bottles were each filled with a sample of pulp (each sample being 375 g of a 4.0 percent consistency pulp) prepared according to the method of Example 1 for making the pulp. The pulp was then treated using the method of Example 6, except that the temperature was 180 degrees F. (82.2 degrees C.) and the pH of the pulp was adjusted to 8.5 prior to bleaching.

EXAMPLE 9

Hydrosulfite +CTAB, Lower pH

Two bottles were each filled with a sample of pulp (each sample being 375 g of a 4.0 percent consistency pulp) prepared according to the method of Example 1 for making the pulp. The pulp was then treated using the method of Example 6, except that the pH was adjusted to 5.5 prior to bleaching instead of 7.0.

EXAMPLE 9A

Hydrosulfite +CTAB, Elevated pH

Two bottles were each filled with a sample of pulp (each sample being 375 g of a 4.0 percent consistency pulp) prepared according to the method of Example 1 for making the pulp. The pulp was then treated using the method of Example 6, except that the pH was adjusted to 10.0 prior to bleaching instead of 7.0.

EXAMPLES 10–20

Use of Different Quaternary Compounds

Two bottles were each filled with a sample of pulp (each sample being 375 g of a 4.0 percent consistency pulp prepared according to the method of Example 1 for making the pulp. The pulp was then treated using the method of Example 6, except that the quaternary compound was changed as listed in Table II. Thus, instead of CTAB, 10 ml of a 0.75 percent solution (weight percent) of the compound listed in Table II was added to the pulp.

Note that the hexadecyltributyl phosphonium bromide was purchased commercially from Aldrich (#27,620-0) 97%.

EXAMPLES 21–25

Comparative Examples

These Examples do not describe the invention, but are used here to show the superior performance of the invention. These Examples were conducted using the same method as described in Example 6, except that 10 ml of a 0.75 percent (weight/weight) solution of the additive indicated in Table II was used.

As noted above, brightness data was evaluated in relation to samples bleached with hydrosulfite alone. The ISO brightness value for a pad made with pulp bleached with only hydrosulfite was 63.5 percent. A threshold standard of one point of brightness gain was selected. Thus, a brightness value of at least 64.5 percent was needed to show substantial improvement over the baseline value of 63.5 percent. An analysis of the brightness data in Tables I and II shows that compounds of the instant invention gave superior brightness over that of the other compounds tested.

Note that for Example 21 strength data was obtained and the value for the breaking length was 4754 meters.

TABLE I

DESCRIPTION OF TREATMENT

| Example | Description | ISO Brightness (percent) | Breaking Length (meters) |
|---|---|---|---|
| 1 | Unbleached pulp | 36.0 | 4252 |
| 2 | Peroxide bleached pulp | 44.0 | 4388 |
| 3 | Sodium hydrosulfite bleached pulp | 63.5 | 4672 |
| 3A | Duplicate of 3 | | 4987 |
| 3B | FAS bleached pulp | 65.2 | 4752 |
| 4 | Peroxide followed by hydrosulfite bleaching | 72.0 | 4376 |
| 5 | Hydrosulfite preblended with CTAB | 73.4 | 5420 |
| 6 | Hydrosulfite and CTAB added separately | 73.4 | 5537 |
| 6A | FAS and CTAB added separately | 72.2 | NA |
| 7 | Example 6 plus DTPA (a chelate) | 73.9 | NA |
| 8 | Hydrosulfite alone at elevated temperature and pH | 65.9 | NA |
| 8A | Hydrosulfite + CTAB at elevated temperature and pH | 76.0 | NA |
| 9 | Hydrosulfite + CTAB at pH 5.5 | 73.7 | NA |
| 9A | Hydrosulfite + CTAB at pH 10.0 | 67.2 | NA |
| 11 | Hydrosulfite + Octadecyltrimethyl ammonium bromide | 69.4 | 5486 |

TABLE II

DESCRIPTION OF TREATMENT

| Example | Additive Used | ISO Brightness (percent) |
|---|---|---|
| Control | Sodium hydrosulfite alone | 63.5 |
| 10 | Tetrabutyl ammonium hydrogen sulfate | 68.4 |
| 11 | Octadecyltrimethyl ammonium bromide | 69.4 |
| 12 | Myristyltrimethyl ammonium bromide | 68.3 |
| 13 | Cetyldimethylethyl ammonium bromide | 73.0 |
| 14 | Cetyltrimethyl ammonium hydrogen sulfate | 74.4 |
| 15 | Cetyltrimethyl ammonium chloride | 72.8 |
| 16 | Cetyl pyridinium bromide | 68.7 |
| 17 | Hexadecyltributyl phosphonium bromide | 73.4 |
| 18 | Didecyldimethyl ammonium bromide | 74.1 |
| 19 | Methyl-bis-(2-hydroxyethyl)coco-ammonium chloride [Ethoquad ™ quat from Akzo] | 68.6 |
| 20 | Cetyltrimethyl ammonium hydroxide | 73.9 |
| | Comparative Examples | |
| 21 | Dodecyltrimethyl ammonium bromide | 63.5 |
| 22 | Tetramethyl ammonium hydroxide | 63.9 |
| 23 | Butyltripropyl ammonium bromide | 63.8 |
| 24 | Tetrabutyl ammonium hydroxide | 63.4 |
| 25 | 3-Chloro-2-hydroxypropyl ammonium chloride | 63.6 |

What is claimed is:

1. A method for brightening fiber from color dyed waste paper while increasing the strength of the fiber which method comprises:

(A) obtaining a slurry of the fiber from color dyed waste paper;

(B) heating said slurry to a temperature in the range of 50–82 degrees C.;

(C) adjusting the pH of said heated slurry to be in the range of 5.5–11.0;

(D) thereafter contacting said pH adjusted slurry with a bleaching chemical selected from the group consisting of hydrosulfite and formamidine sulfinic acid;

(E) contacting said slurry with said bleaching chemical and at least one of a quaternary compound selected from the group consisting of (a) compounds of Formula I:

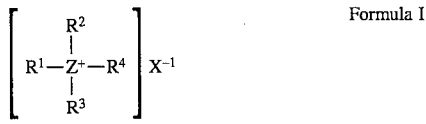

Formula I wherein:

one of $R^1$, $R^2$, $R^3$ and $R^4$ is selected from the group consisting of $C_{14}-C_{22}$ alkyl and $C_{14}-C_{22}$ alkenyl, wherein the alkyl or alkenyl optionally contains one to three substituents selected from methyl and ethyl;

the other three of $R^1$, $R^2$, $R^3$ and $R^4$ are each independently selected from the group consisting of $C_1-C_4$ straight chain alkyl, $-(C_2H_4O)_xH$ and $-(C_3H_6O)_xH$ where x=a number from 1 to 4;

Z is selected from the group consisting of nitrogen and phosphorous; and $X^{-1}$ is selected from the group consisting of $CO_3^{-2}$, $HCO_3^{-1}$, $PO_4^{-3}$, $HPO_4^{-2}$, $H_2PO_4^{-1}$, $OH^{-1}$, $F^{-1}$, $Cl^{-1}$, $I^{-1}$, $HSO_3^{-1}$, $HSO_4^{-1}$, $SO_4^{-2}$, $S_2O_4^{-2}$, $CH_3CO_3^{-1}$, $CH_3SO_4^{-1}$;

(b) compounds of Formula II:

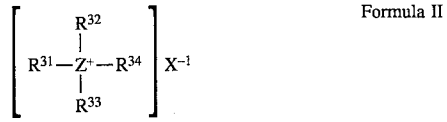

Formula II wherein:

two of $R^{31}$, $R^{32}$, $R^{33}$ and $R^{34}$ are selected independently from the group consisting of $C_8-C_{22}$ straight chain alkyl and $C_8-C_{22}$ alkenyl, wherein the alkyl or alkenyl optionally contains one to three substituents selected from methyl and ethyl;

the other two of $R^{31}$, $R^{32}$, $R^{33}$ and $R^{34}$ are each independently selected from the group consisting of $C_1-C_4$ straight chain alkyl and $-(C_2H_4O)_xH$ and $-(C_3H_6O)_xH$ where x=a number from 1 to 4; and Z and $x^{-1}$ each have the same meaning as defined under Formula I;

(c) compounds of Formula III:

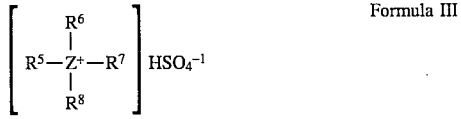

Formula III wherein:

$R^5$, $R^6$, $R^7$ and $R^8$ are each independently selected from the group consisting of $C_1-C_4$; and Z has the same meaning as defined for Formula I;

(d) a pyridinium salt of Formula IV:

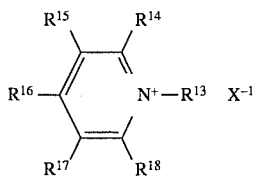

Formula IV wherein;
$R^{13}$ is selected from the group consisting of $C_{14}$–$C_{22}$ alkyl and $C_{14}$–$C_{22}$ alkenyl, wherein the alkyl or alkenyl optionally contains one to three substituents selected from methyl and ethyl;

the other five of $R^{14}$, $R^{15}$, $R^{16}$, $R^{17}$ and $R^{18}$ are each independently selected from the group consisting of hydrogen, $C_1$–$C_3$ straight chain alkyl; and $X^{-1}$ has the same meaning as described in Formula I;

(e) compounds of Formula V:

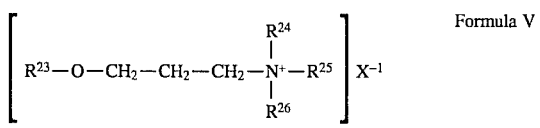

Formula V wherein:
$R^{23}$ is selected from the group consisting of $C_8$–$C_{14}$ alkyl and $C_8$–$C_{14}$ alkenyl, where the alkyl and alkenyl optionally have one to three substituents selected from methyl and ethyl; and each of $R^{24}$, $R^{25}$, and $R^{26}$ are independently selected from the group consisting of $C_1$–$C_4$ alkyl, $C_2$–$C_4$ alkenyl, $(CH_2-CH_2-O)_nH$ and $(CH_2-CH_2-CH_2-O)_nH$ where n=a number from 1 to 4;

to produce a fiber with higher brightness and strength wherein the use of said at least one quaternary compound in said steps (A)–(E) produces a fiber with higher pulp strength compared with a fiber bleached in similar conditions but without the use of said at least one quaternary compound.

2. A method as claimed in claim 1 wherein Z is selected to be nitrogen.

3. A method as claimed in claim 1 where the bleaching chemical is sodium hydrosulfite.

4. A method as claimed in claim 1 wherein $X^{31\ 1}$ is selected from the group consisting of $HSO_4^{-1}$, $CH_3CO_3^{-1}$ and $CH_3SO_4^{-1}$, $Br^{-1}$, $Cl^{-1}$, $I^{-1}$ and $OH^{-1}$.

5. A method as claimed in claim 4 wherein $X^{-1}$ is selected from the group consisting of $HSO_4^{-1}$, $CH_3CO_3^{-1}$ and $CH_3SO_4^{-1}$.

6. A method as claimed in claim 1 wherein one of $R^1$, $R^2$, $R^3$ and $R^4$ has a methyl substituent.

7. A method as claimed in claim 1 wherein one of $R^{31}$, $R^{32}$, $R^{33}$ and $R^{34}$ has a methyl substituent.

8. A method as claimed in claim 1 wherein $R^{13}$ has a methyl substituent.

9. A method as claimed in claim 1 wherein $R^{23}$ has a methyl substituent.

10. A method as claimed in claim 1 wherein said quaternary compounds are compounds of Formula I where $R^1$ is a straight chain alkyl, each of $R^2$, $R^3$ and $R^4$ is methyl, and $X^{-1}$ is selected from the group consisting of $HSO_4^{-1}$, $Br^{-1}$ and $Cl^{-1}$.

11. A method as described in claim 1 wherein said quaternary compound is selected from the group consisting of cetyltrimethylammonium hydrogen sulfate, cetyltrimethylammoniumbromide, cetyltrimethylammonium chloride, octadecyltrimethylammonium bromide, tetrabutylammonium hydrogen sulfate, myristyltrimethylammonium bromide, cetyldimethylammonium bromide, cetylpyridinium bromide, hexadecyltributylphosphonium bromide, didecyldimethyl ammonium bromide, cetyltrimethyl ammonium hydroxide and methyl-bis-(2-hydroxyethyl)cocoammonium chloride.

12. A method as claimed in claim 11 wherein said quaternary compound is selected from the group consisting of cetyltrimethylammonium hydrogen sulfate, cetyltrimethylammonium bromide and cetyltrimethylammonium chloride.

13. A method as claimed in claim 1 wherein for any of the R group numbered 1–8, 24–26 and 31–34, in Formulae I through V, at least one carbon in one of said R groups which is (a) attached to the nitrogen or phosphorous, (b) adjacent to the nitrogen or phosphorous or (c) next adjacent to the nitrogen, is substituted by at least one electron withdrawing group selected from the group consisting of chlorine, fluorine, $CH_2F$, and $CF_3$, provided that chlorine and fluorine are not attached to nitrogen or phosphorous.

14. A method as claimed in claim 13 wherein at least one compound in Formulae I through V has at least two electron withdrawing groups.

15. A method as claimed in claim 13 wherein the compound of Formula I contains at least one electron withdrawing group and is selected from the group consisting of (a) compounds of Formula IA:

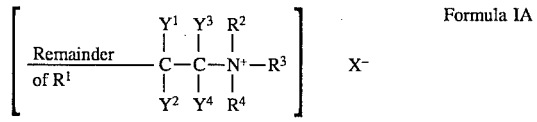

Formula IA wherein $R^1$, $R^2$, $R^3$ and $R^4$ have the meanings described for Formula I, and each of the $Y^1$, $Y^2$, $Y^3$ and $Y^4$ substituents is independently selected from the group consisting of chlorine, fluorine, $CH_2F$ and $CF_3$;

(b) compounds of Formula I in which at least one of $R^2$, $R^3$ and $R^4$ is independently selected from the group consisting of $CH_2F$ and $CF_3$;

(c) compounds of Formula II in which at least one of $R^{32}$, $R^{33}$ $R^{34}$ is independently selected from the group consisting of $CH_2F$ and $CF_3$; and (d) compounds of Formula IV in which at least one of $R^{14}$–$R^{18}$ is selected from the group consisting of chlorine, fluorine, $CH_2F$ and $CF_3$.

16. The method as claimed in claim 1, comprising combining said bleaching chemical and said quaternary compound wherein said combining step is selected from one of the following steps:

(1) premixing a solution of bleaching chemical and quaternary compound and then adding that solution to a pulp slurry; or (2) adding the quaternary compound to a pulp slurry at the same time as the bleaching chemical is added for bleaching; or (3) adding the quaternary compound to a pulp slurry shortly before the bleaching chemical is added.

17. A method as claimed in claim 1 wherein a bleach solution containing said bleaching chemical is stabilized with at least one chelate or alkaline substance.

18. A method as claimed in claim 17 wherein the bleach solution containing said bleaching chemical is stabilized with at least one member selected from the group consisting of ethylenediaminetetraacetic acid, sodium tripolyphosphate, and diethyleneaminepentaacetic acid, sodium hydroxide, sodium carbonate and calcium hydroxide.

19. A method as claimed in claim 1 wherein $R^1$ is selected from a group containing $C_{14}$–$C_{18}$ straight chain alkyls.

20. A method as claimed in claim 19 where in $R^1$ is $C_{16}$ straight chain alkyl.

21. A method as claimed in claim 1 wherein said quaternary compound is selected to be Formula I and $R^1$ is selected from the group tallow and coco fatty alkyl; Z is nitrogen; one of $R^2$, $R^3$ and $R^4$ is methyl; the other two of $R^2$, $R^3$ and $R^4$ are each $(CH_2CH_2O)H$; and $X^{-1}$ is $Cl^{-1}$.

22. A method as claimed in claim 1 wherein said quaternary compound is selected from the group consisting of methyl-bis-(2-hydroxyethyl)tallow-ammonium chloride and methyl-bis-(2-hydroxy-ethyl)coco-ammonium chloride.

23. A method as claimed in claim 1 wherein two of $R^{31}$–$R^{34}$ are selected independently from the group consisting of $C_{10}$–$C_{18}$ straight chain alkyl.

24. A method as claimed in claim 1 wherein two of $R^{31}$–$R^{34}$ are selected to be $C_{12}$ straight chain alkyl.

25. A method as claimed in claim 1 wherein $R^6$, $R^7$ and $R^8$ are each selected to be methyl.

26. A method as claimed in claim 1 wherein $R^{13}$ is selected from the group consisting of $C_4$–$C_{18}$ straight chain alkyl and $R^{14}$ and $R^{15}$ are each hydrogen.

27. A method as claimed in claim 26 wherein $R^{13}$ is $C_{16}$.

28. A method as claimed in claim 1 wherein $R^{23}$ is selected from the group consisting of $C_8$–$C_{14}$ straight chain alkyl and $R^{24}$, $R^{25}$ and $R^{26}$ are each independently selected from the group consisting of $C_1$–$C_4$ straight chain alkyl.

29. A method as claimed in claim 1 wherein $R^6$, $R^7$ and $R^8$ are each selected to be methyl.

* * * * *